Figure 1:
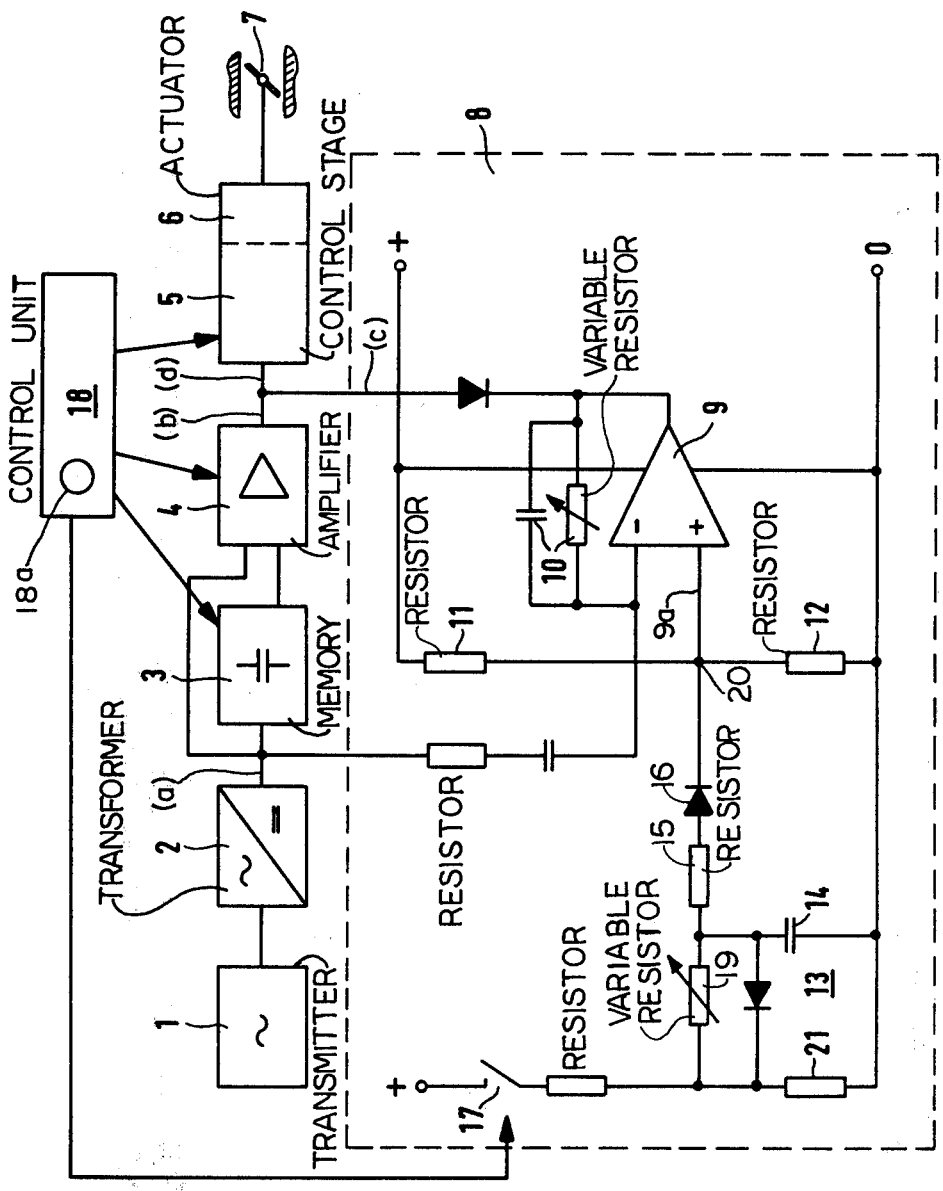

United States Patent [19]

Allerdist

[11] 4,133,406
[45] Jan. 9, 1979

[54] APPARATUS FOR CONTROLLING THE TRAVELING SPEED OF A MOTOR VEHICLE

[75] Inventor: Heinz Allerdist, Bad Homburg, Germany

[73] Assignee: VDO Adolf Schindling AG, Frankfurt am Main, Germany

[21] Appl. No.: 730,453

[22] Filed: Oct. 7, 1976

[30] Foreign Application Priority Data

Oct. 9, 1975 [DE] Fed. Rep. of Germany ....... 2545294

[51] Int. Cl.² .............................................. B60K 31/00
[52] U.S. Cl. .................................. 180/105 E; 123/102
[58] Field of Search ........................... 180/105 E, 108; 123/102

[56] References Cited

U.S. PATENT DOCUMENTS

| | | | |
|---|---|---|---|
| 3,476,206 | 11/1969 | Thorner | 180/108 |
| 3,580,355 | 5/1971 | Kitano | 180/105 E |
| 3,767,972 | 10/1973 | Niddings et al. | 180/105 E |
| 3,983,954 | 10/1976 | Noddings et al. | 180/105 E |

Primary Examiner—Joseph F. Peters, Jr.
Assistant Examiner—Donn McGiehan
Attorney, Agent, or Firm—Martin A. Farber

[57] ABSTRACT

An apparatus for controlling the traveling speed of a motor vehicle with an electrical control unit acted upon by a speed dependent signal, which unit compares the then present actual speed with a desired speed fed into a storage memory unit, and upon a deviation of the actual speed from the desired speed, a deviation signal dependent on the magnitude of the deviation is transmitted to a control stage, the latter influencing the ratio of the fuel-air mixture which is fed to the vehicle motor, as well as a manual operatively switchable circuit for acceleration of the vehicle to the desired driving speed stored in the storage memory unit. A differentiating stage is provided an input which is fed with the speed dependent signal. The output signal of the differentiating unit influences the deviation signal directly or indirectly in the sense of a decrease (compared to a deviation signal were the differentiating unit absent). Means for the additional time dependent variation of the output signal of the differentiating unit are provided of such type that with increasing time from the moment of turning on the manually operative switchable circuit, the output signal of the differentiating unit changes in the sense of increasing the acceleration.

8 Claims, 2 Drawing Figures

APPARATUS FOR CONTROLLING THE TRAVELING SPEED OF A MOTOR VEHICLE

The present invention relates to an apparatus for controlling the traveling speed of a motor vehicle with an electrical control unit acted upon by a speed dependent signal, which unit compares the then present actual speed with a desired speed fed into a storage memory unit, and by a deviation of the actual speed from the desired speed, a deviation signal dependent on the magnitude of the deviation is transmitted to a control stage, the latter influencing the ratio of the fuel-air mixture which is fed to the vehicle motor, as well as a manual operatively or effectively switchable circuit for acceleration of the vehicle to the desired driving speed stored in the storage memory unit.

With the known devices of the previously described construction, in addition to a number of switches for controlling the device, also a switch exists which upon actuation again turns on the control device which previously was turned-off, and simultaneously accelerates or to brakes (decelerate) the vehicle to a previously desired vehicle speed which was stored before the control device was turned off. For example, thus after braking of a motor vehicle traveling with a desired controlled speed of 80 km/hour to a speed of 40 km/hour, the control device which is automatically turned off during this braking operation, merely by a subsequent brief actuation of the above-mentioned switch, is turned on again, the vehicle is again accelerated to the previously stored controlled speed of 80 km/hour. The control device thereby attempts to bring the vehicle in the fastest time to the previously desired speed, which means that the vehicle is accelerated at a maximum rate. During acceleration operations from low speeds, that is starting the control actuation while driving at low actual speeds, particularly with high power vehicle motors, this leads to a spinning or racing of the driving gear. In situations beyond this, unfavorable traffic conditions may exist which could lead to a dangerous swerving of the vehicle.

It is an object of the present invention to provide an apparatus for controlling the traveling speed of a motor vehicle which avoids the above disadvantages of the presently known devices. Accordingly, it is another object of the invention to provide a device which guarantees that particularly during an acceleration of the vehicle from a relatively low actual traveling speed to a comparatively high, stored desired speed no acceleration values occur which bring about critical driving situations. Further the expense which is required therefor is to be as low as possible and with no, or if necessary a negligible effect on the construction volume.

This object is aided in its solution in accordance with yet another object of the present invention starting out from the introductory described device in a manner that there is provided a differentiating unit e.g., (8) or (8') which is fed with the speed dependent signal (a), the output signal (c) or (c') of which unit effectively influences the deviation signal directly or indirectly in the sense of a decrease of the acceleration, and means for the additional time dependent variation of the output signal of the differentiating unit of such type that with increasing time from the moment of turning on the manually operative switchable circuit, the output signal of the differentiating stage changes in the sense of increasing the acceleration.

By the device in accordance with the present invention the signal (the output signal (c') from the differentiating unit (8') formed by the differentiating unit, the magnitude of which is large at the beginning of the acceleration operation toward the desired speed and is zero at the end of the same, for example, is added to the speed dependent signal (a) from the output of the frequency-voltage transformer. This constitutes a direct influence of the speed dependent signal (a). As a consequence of this, the magnitude of the deviation signal (f) (which signal is basically dependent on the deviation of the actual speed from the desired speed) is smaller than that which would correspond to the actual conditions of deviation of the actual speed from the desired speed if this differentiation stage were not present. Accordingly at the start and during the acceleration operation at the control stage there is provided a deviation signal (f) of a value that constitutes a smaller deviation or difference of the actual speed from the desired speed than is actually present and consequently the fuel-air mixture is influenced in the sense of an acceleration decrease.

In this manner it is guaranteed that acceleration values do not occur which can lead to critical driving situations. Since the acceleration dependent signal c or c' (the output signal c or c' from the differentiating unit 8 or 8') produced in the differentiating unit is zero upon attaining the desired speed — during constant driving speeds indeed the acceleration is equal to zero — moreover it is also guaranteed that the vehicle actually attains the desired stored speed.

A particular advantage of the invention resides in that a construction set provided in accordance with the invention requires the smallest space, is inexpensive and subsequently can be installed without difficulties in already built-in devices.

As already mentioned the influence of the speed dependent signal (a) (the output signal of the frequency voltage transformer) can take place in the manner that the signal (c') produced by the differentiating unit (8') is added to the speed dependent signal (a), that is, by directly influencing the speed dependent signal (a), or, — advantageous on the basis of circuitry considerations and features, it can take place in the manner that the output signal (c) of the differentiating unit (8) decreasingly influences a signal (b) (at the output of the differential amplifier), which signal (b) is dependent on the magnitude of the deviation of the actual speed from the desired speed. The latter constitutes an indirect influencing of the speed dependent signal (a) via the signal (b).

In accordance with a preferred embodiment of the invention, as a differentiating stage there is provided an operational amplifier (op amp) connected or wired with a differential element.

According to the invention, with the means for the additional time dependent variation of the output signal (c) or (c') of the differentiating unit of such type that with increasing time from the moment of turning on the manually operative switchable circuit, the output signal (c) or (c') of the differentiating stage changes in the sense of increasing the acceleration, this measure brings the advantage that the limitation of the acceleration is fully effective or maximumly operative, not during the entire acceleration operation, but rather only at the very beginning of the acceleration operation toward the desired speed, and thereafter the limitation is successively or gradually reduced and cancelled as the desired speed is approached. That is at the beginning the acceleration is limited so that sudden large acceleration is avoided and gradually the limitation of the acceleration is reduced.

According to a preferred embodiment of the invention, as a means for the time dependent change or variation of the differentiating unit output signal (c) there is provided a timing element which includes a capacitor, the timing element influencing the operating point of the differentiating stage, with the timing member being operatively switchable into operation together with manually active switchable circuit.

Figure 2:
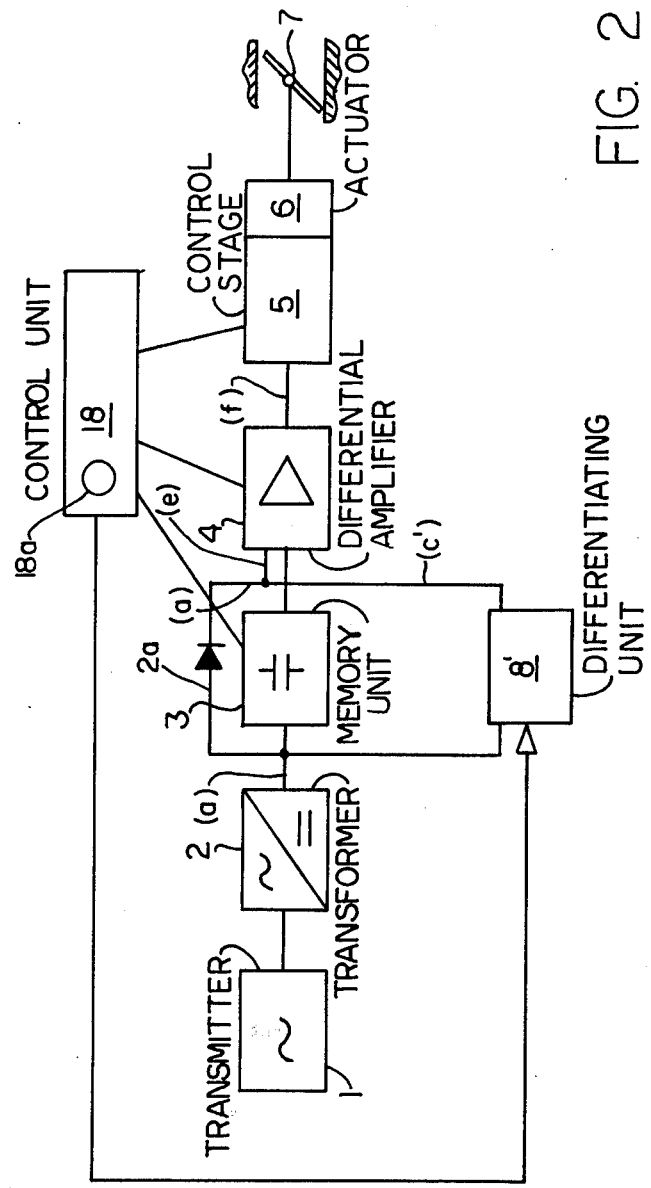

With these and other objects and advantages in view, the present invention will be more clearly understood from the following detailed description of preferred embodiments thereof when considered with the accompanying drawings, of which:

FIG. 1 illustrates a circuit for control of the traveling speed of a vehicle which indirectly influences the speed dependent signal in accordance with the present invention; and FIG. 2 is a similar circuit which directly influences the speed dependent signal in accordance with the invention.

Referring now to FIG. 1, a driving or traveling speed control device includes: a speed pick-up detector or transmitter 1, the output signal of which has a frequency proportional to the traveling speed of the vehicle; a frequency-voltage-transformer 2 connected to the transmitter 1, the output signal (a) of the transformer 2, constituting the speed dependent signal, being fed in one path indirectly to a differential amplifier 4 via a storage or memory unit 3 and in another path directly to the differential amplifier 4, the latter comparing therein the instantaneous actual value of the speed via the signal (a) with a desired stored speed value and providing a differential amplification output signal (b) dependent on the deviation of the actual speed from the desired speed. In the case of a deviation of the actual speed value from the desired speed, the potential in the differential amplifier 4 output is raised or lowered, the latter being connected with a control stage 5. The control stage 5 includes a pneumatic actuator 6, which is coupled to the throttle valve 7 on the motor of the vehicle. The manually active switchable circuit for activating the control system for acceleration of the vehicle to the desired traveling speed stored in the memory unit is disposed in the operating unit 18 and partially in the memory unit 3 and in the differential amplifier box 4. A button 18a constituting a part of this circuit is provided in the operating unit 18 for turning on the manually active switchable circuit.

The output of the frequency-voltage-transformer 2 is further connected via a differentiating stage or unit 8 with the input of the control stage 5 and the output of the differential amplifier 4. An operational amplifier 9 is provided as a differentiating stage which is connected with a differentiating circuit member 10, the latter comprising a capacitor and a variable resistor in parallel therewith. For the time dependent variation or change of the operating point of the operational amplifier 9, which operating point is determined by two resistors 11 and 12, there is provided a timing member 13 which includes a capacitor 14 and which is connected with the operational amplifier 9 via the resistor 15 and a diode 16. By means of an operating contact 17 which is closed by a relay (not illustrated), the latter being disposed in the control stage 5, if the speed restart or control resumption switch 18a in the control or operating unit 18 is actuated, the timing member 13 is settable to normal or operating voltage potential. An actuation of the closed contact 17 in the sense of opening this contact 17 takes place by turning or switching the control device off, which is possible manually as well as by application of the brake or clutch of the vehicle.

For explanation of the manner of operation of the device of the invention concerning limitation the acceleration, consider starting out with the entire device being switched off and the vehicle moving with an uncontrolled speed which lies somewhat above the minimum speed provided for the control device. The minimum speed for example may be approximately 30 km/hour. The desired speed which is stored in the storage memory 3, e.g., may be 120 km/hour.

If now the speed restart switch in the control or operating unit 18 is momentarily actuated, thus the entire control device on the one hand is turned on and simultaneously the contact 17 thereby is self-lockingly or self-holdingly closed. Since the actual speed according to the example considered above is relatively small (being merely somewhat above the mimimum speed) and a high desired speed exists, then the differential amplification output signal (b) appearing at the output of the differential amplifier 4 at the instant of the actuation of the speed control restart switch is correspondingly high. The result is that the acceleration signal (c) (which acceleration signal (c) is produced by differentiation in the differentiating unit (8) of the speed dependent or proportional output signal (a) of the frequency-voltage-transformer 2) likewise is high and consequently, since the differential amplification output signal (b) from the output of the differential amplifier 4 is reduced by the acceleration signal (c) from the differentiating stage 8, then a deviation signal (d) for regulation is supplied to the control stage 5, which deviation signal (d) has a substantially smaller magnitude than that of the time difference between the actual speed and the desired speed as represented by the signal (b). The vehicle accelerates thus slower than with the previously known devices which do not have the differentiating unit in accordance with the present invention.

By the invention in accordance with the additional time dependent varation of the differentiating unit output signal as already mentioned, upon actuation of the speed restart control resumption switch, the operating contact 17 also closes. In this manner the capacitor 14 charges over the variable resistor 19 which is connected thereto, and after attaining a threshold voltage, the potential rises at the point 20 and with this at the normal input 9a of the operational amplifier 9. This has the result of increasing the working or operating point of the operational amplifier 9 in such a direction that its output signal (c) is reduced with the same signal at the other input. The maximum predetermined acceleration value as a consequence of this is increased. The lowering of the output signal (c) of the operational amplifier 9 continues until the maximum acceleration of the vehicle is achieved.

Upon reaching and during driving with the desired controlled speed, the output signal (c) of the operational amplifier 9 is equal to zero — by driving with constant speed no acceleration occurs as known.

As soon as the brake or the clutch is applied or as soon as the control device is turned off in another manner, the operating contact 17 opens again and the capacitor 14 discharges quickly over the low ohmic resistor 21.

Referring now again to the drawings, and more particularly to FIG. 2, there is shown a circuit in accordance with the present invention for control of the traveling speed of a vehicle which directly influences the speed dependent signal (a) from the frequency-voltage-transformer 2. Identical circuit parts in FIG. 2 have been designated with the same reference characters as in FIG. 1 and function in the same manner, so that further description herein is not necessary. The input of the differentiating stage 8' is connected to the output of the frequency-voltage-transformer 2 and receives the speed dependent signal (a) therefrom, which signal (a) is differentiated in the differentiating stage 8' as well as being sent via the line 2a by-pasing the memory unit 3 to the differential amplifier 4. The output of the differentiating unit 8' is directly connected to the line 2a from the output of the transformer 2 which by-passes the memory unit 3 which line 2a feeds into the differential amplifier 4. The differentiated output signal (c') from the differentiating unit 8' directly added to the speed dependent signal (a) from the transformer 2 and the modified speed dependent signal (e) is fed into one of the inputs of the differential amplifier 4 in a sense of an increase of the speed dependent signal (e) (i.e., the signal (e) is greater than the signal (a)) so as to reduce the acceleration of the vehicle.

While I have disclosed two embodiments of the present invention, it is to be understood that these embodiments are given by example only and not in a limiting sense.

I claim:

1. In an apparatus for controlling the traveling speed of a motor vehicle with an electrical control unit acted upon by a speed dependent signal, which unit compares the then present actual speed, by means of the speed dependent signal, with a predetermined desired speed fed into a storage memory unit and upon a deviation of the actual speed from the desired speed transmits a deviation signal which is dependent on the magnitude of the deviation, and including a manually operatively switchable circuit for activating an acceleration operation of the vehicle to the desired speed stored in the storage memory unit, the improvement comprising in combination a differentiating unit means for receiving the speed dependent signal and for producing a differentiating unit output signal for operatively influencing the deviation signal in the sense of a decrease thereof, a control stage means for receiving the influenced deviation signal and for influencing the ratio of the fuel-air mixture fed to the motor vehicle and the acceleration depending on the influenced deviation signal, means for additional time dependent variation of said output signal of said differentiating unit means such that with increasing time from a moment of turning on the circuit, the effect of the differentiating unit means is successively reduced and said output signal of said differentiating unit means changes in a sense of increasing the acceleration of the vehicle, the acceleration limitation being fully effective at the beginning of the acceleration operation, the acceleration limitation being provided only during a certain period of time.

2. The apparatus as set forth in claim 1, wherein said differentiating unit means is for directly influencing the deviation signal in the sense of a decrease thereof.

3. The apparatus as set forth in claim 1, wherein said differentiating unit means is for indirectly influencing the deviation signal in the sense of a decrease thereof.

4. The apparatus as set forth in claim 1, including circuitry means for causing said output signal of said differentiating unit means to decreasingly influence said deviation signal.

5. The apparatus as set forth in claim 1, wherein said output signal of said differentiating unit means relatively reduces with increasing time with respect to the speed dependent signal.

6. The apparatus as set forth in claim 1, wherein said differentiating unit means includes a differentiating stage having one input means for receiving said speed dependent signal and a normal input, said means for additional time dependent variation of said output signal comprises a timing circuit means including a capacitor, said timing circuit means for switching into operation upon actuation of the manually operatively switchable circuit and for changing the operating point of said differentiating stage via said normal input.

7. The apparatus as set forth in claim 6, wherein said differentiating stage comprises an operational amplifier, and a differentiating circuit member comprising a second capacitor and a variable resistor both connected in parallel with said operational amplifier, two resistors connected to positive and ground potential, respectively, are connected to said normal input, the latter also constituting a normal input of said operational amplifier, a second resistor and a diode in series connected to said normal input between said two resistors and said first mentioned capacitor, a second variable resistor connected to said first mentioned capacitor and to said second resistor, said first mentioned capacitor in turn is connected to ground potential, a second diode is connected in parallel to said second variable resistor and at one end to a common junction between said first mentioned capacitor, said second variable resistor and said second resistor, a low-ohmic resistor is connected between ground potential and the other end of said second diode, an operating contact means is connected between positive potential and said low-ohmic resistor and to said manually operatively switchable circuit for self-lockingly closing upon actuation of the latter, said operating contact means for manually opening as well as upon application of a brake and clutch, respectively, of the vehicle.

8. A method for controlling the traveling speed of a motor vehicle comprising the steps of initiating a control operation, providing a speed dependent signal in dependency on the actual speed of the vehicle, transmitting the speed dependent signal through a by-pass line toward a comparator as well as toward a differentiating unit in an other line, differentiating the speed dependent signal from the other line and forming a differentiation output signal, effectively adding said differentiation output signal to said speed dependent signal from the by-pass line so as to simulate an effectively modified increased speed dependent signal, comparing the effectively modified speed dependent signal in the comparator with a desired stored speed and forming a deviation signal dependent on the deviation of the actual speed from the desired speed, controlling the ratio of the air-fuel mixture for the vehicle in dependency on said deviation signal and accelerating the vehicle dependent thereon, the effect of the differentiation output signal on the deviation signal providing an acceleration limitation, varying the differentiation output signal additionally as a function of time to increase the acceleration of the vehicle by successively decreasing the acceleration limitation by changing the output signal in a sense of increasing the acceleration of the vehicle with increasing time from the moment of initiating the control operation, with the acceleration limitation being fully effective at the beginning of the control operation and the acceleration limitation being provided only during a certain period of time.

* * * * *